(12) United States Patent
Ishikawa et al.

(10) Patent No.: US 9,660,246 B2
(45) Date of Patent: May 23, 2017

(54) BATTERY TERMINAL

(71) Applicant: Yazaki Corporation, Tokyo (JP)

(72) Inventors: Yoshinori Ishikawa, Makinohara (JP); Shinya Onoda, Makinohara (JP)

(73) Assignee: Yazaki Corporation, Tokyo (JP)

( * ) Notice: Subject to any disclaimer, the term of this patent is extended or adjusted under 35 U.S.C. 154(b) by 29 days.

(21) Appl. No.: 14/863,501

(22) Filed: Sep. 24, 2015

(65) Prior Publication Data

US 2016/0093868 A1 Mar. 31, 2016

(30) Foreign Application Priority Data

Sep. 26, 2014 (JP) ................. 2014-196602

(51) Int. Cl.
*H01M 2/34* (2006.01)
*H01M 2/30* (2006.01)
*H01M 10/48* (2006.01)

(52) U.S. Cl.
CPC ............. *H01M 2/34* (2013.01); *H01M 2/305* (2013.01); *H01M 10/48* (2013.01); *H01M 2200/103* (2013.01); *H01M 2220/20* (2013.01)

(58) Field of Classification Search
CPC ........ H01M 2/34; H01M 2/305; H01M 10/48; H01M 2220/20; H01M 2200/103
See application file for complete search history.

(56) References Cited

U.S. PATENT DOCUMENTS

| | | | | |
|---|---|---|---|---|
| 2013/0011703 A1* | 1/2013 | Kim | ........................ | H01M 2/30 429/61 |
| 2015/0357623 A1* | 12/2015 | Onoda | ..................... | H01M 2/34 429/61 |
| 2016/0093869 A1* | 3/2016 | Ishikawa | ................. | H01M 2/34 429/61 |

FOREIGN PATENT DOCUMENTS

| | | |
|---|---|---|
| JP | 2011-187301 A | 9/2011 |
| JP | 2012-003904 A | 1/2012 |

OTHER PUBLICATIONS

Machine Translation JP-2012003904A.*
Notification of Reasons for Refusal drafted Sep. 28, 2016, issued for the Japanese Patent Application No. 2014-196602 and English translation thereof.
Office Action drafted on Dec. 27, 2016 issued for corresponding Japanese Patent Application No. 2014-196602.

* cited by examiner

*Primary Examiner* — Stewart Fraser
(74) *Attorney, Agent, or Firm* — Locke Lord LLP

(57) ABSTRACT

A battery terminal includes a terminal body and a component terminal. The terminal body is connected to a rod-like electrode which projects from a terminal mounting surface of a battery and extends toward an outer periphery of the terminal mounting surface. An external fuse (electrical component) is connected to the component terminal. The terminal body and the component terminal are formed by being cut integrally from a single plate made of a conductive metal.

6 Claims, 5 Drawing Sheets

BATTERY TERMINAL

BACKGROUND

Technical Field

The present invention relates to a battery terminal mounted on a battery to relay supply of power from the battery.

Related Art

In conventional, it has often been the case in vehicles that power is supplied from a battery via a battery terminal (e.g., see JP 2011-187301 A).

In FIG. 4, a fuse unit including a related art example of a battery terminal is illustrated. A fuse unit 5 illustrated in FIG. 4 is directly mounted on a rod-like electrode 62, which projects from a terminal mounting surface 61 of a battery 6, and includes a battery terminal 51 and a fusible link 52. FIG. 5 is an exploded view of the fuse unit illustrated in FIG. 4.

The battery terminal 51 is an approximately rectangular-shaped terminal in a plan view, with an electrode insertion hole 511 provided on the side of one end of the battery terminal 51 in the longitudinal direction. The rod-like electrode 62 of the battery 6 is inserted through the electrode insertion hole 511. On the side of the other end of the battery terminal 51 in the longitudinal direction, a screw 512 that connects the battery terminal 51 with the fusible link 52 is provided. The battery terminal 51 has a shape extending toward an outer periphery 61a of the terminal mounting surface 61 when connected to the rod-like electrode 62 of the battery 6.

The fusible link 52 includes a power supply terminal 521, two circuit terminals 522, and a fusible body 523.

The battery terminal 51 is coupled to the power supply terminal 521 to supply power through the battery terminal 51. The power supply terminal 521 has an insertion hole 521a through which the screw 512 of the battery terminal 51 is inserted. When the screw 512 is inserted into the insertion hole 521a and fastened with a nut 513, the battery terminal 51 is connected to the power supply terminal 521.

A circuit that operates with power from the battery 6 is coupled to each of the two circuit terminals 522. Each circuit terminal 522 is provided with a screw 522a for coupling, for example, a round terminal or the like that constitutes a circuit.

The fusible body 523 is formed by connecting the power supply terminal 521 and the two circuit terminals 522 in a strip-shape manner, with a width of the fusible body 523 being narrower than widths of the power supply terminal 521 and the circuit terminals 522. An electric current flows from the battery 6 to the individual circuit terminals 522 through the power supply terminal 521 via the fusible body 523. When the electric current having a current value equal to or larger than a threshold value is flowed, the fusible body 523 is fused to prevent an excessive current from flowing in the circuit.

The fusible link 52 is formed by covering and fixing (molding), using an insulation resin material, the power supply terminal 521 made of a conductive metal, the two circuit terminals 522, and the fusible body 523. A resin housing 524 made of the insulation resin material covers and fixes part of the power supply terminal 521, the circuit terminal 522, and the fusible body 523, with the connection surfaces of the power supply terminal 521 and the circuit terminals 522 being exposed, and a window 524a being provided to allow viewing fusing of the fusible body 523. A window 524a for visual confirmation of fusing is covered by a transparent cover 525, such that fusing of the fusible body 523 is viewed through the transparent cover 525.

In the example illustrated in FIGS. 4 and 5, a circuit to which power is supplied is connected to a battery terminal 51 via the fusible link 52. Since some, but not large, electrical resistance, is included in the fusible link 52, a voltage drop usually occurs in the fusible link 52. Meanwhile, it may be desirable that an electrical connection with an electrical component be provided other than a main electrical connection with a minimized voltage drop against the battery, such as in the case of the connection between the battery and electrical components associated with a detection circuit that detects a residual capacity of the battery.

The present invention focuses on the above problem. An object of the present invention, therefore, is to provide a battery terminal capable of connecting an electrical component to a battery by suppressing a voltage drop.

SUMMARY

To solve the above problem, a battery terminal according to a first aspect of the present invention includes a terminal body and a component terminal. The terminal body has a shape extending toward an outer periphery of a terminal mounting surface of a battery when the terminal body is connected to a rod-like electrode that projects from the terminal mounting surface. A predetermined electrical component is connected to the component terminal. The terminal body and the component terminal are formed by being cut integrally from a single plate made of a conductive metal.

According to a second aspect of the present invention, the battery terminal according to the first aspect further includes a circuit terminal and a fusible body. The circuit terminal is connected to a circuit that operates by power from the battery. The fusible body connects the battery terminal and the circuit terminal in a strip-shape manner, with a width of the strip being narrower than widths of the battery terminal and the circuit terminal, and is configured to be fused when an electric current equal to or greater than a threshold value flows. The terminal body, the component terminal, the circuit terminal, and the fusible body are formed by being cut integrally from the single plate made of the conductive metal. The component terminal is arranged closer to the terminal body than the fusible body.

According to a third aspect of the present invention, in the battery terminal according to the second aspect, the fusible body extends only in a crossing direction that crosses an extending direction of the battery terminal and approximately in parallel with the terminal mounting surface. Alternatively, the fusible body extends both in the extending direction and the crossing direction such that a part of the fusible body extending in the extending direction is shorter than a part of the fusible body extending in the crossing direction.

According to a fourth aspect of the present invention, in the battery terminal according to any one of the first to third aspects, a fuse is connected between a detection circuit, which detects a residual capacity of the battery, and the battery via a component connector. The component connector includes a pair of terminals formed in a strip-shape manner and arranged opposite to each other such that one of the pair of the terminals is located on the side of the battery and the other of the pair of the terminals is located on the side of the detection circuit. The one of the pair of the terminals located on the side of the battery has one end having a shape clipping one end of the fuse, and the other end of formed integrally with the terminal body. The terminal of the pair of the terminals located on the side of the detection circuit is formed separately from the terminal body, and has one end having a shape clipping the other end of the fuse and the other end being connected to the detection circuit. The component terminal is provided as the terminal of the component connector located on the side of the battery.

According to the first aspect of the present invention, the terminal body and the component terminal are cut integrally from a single plate made of a conductive metal. Therefore, the voltage drop between the terminal body and the component terminal is suppressed. Accordingly, the voltage drop between an electrical component connected to the component terminal and the battery can be suppressed.

According to the second aspect of the present invention, the fusing function is provided to the battery terminal, and the terminal body, the circuit terminal, and the fusible body are cut integrally from a single plate made of a conductive metal. Therefore, the battery terminal integrated with the fuse with a decreased size is obtained. The component terminal is arranged closer to the terminal body than the fusible body, that is, in the upstream side of the fusible body in a current flow from the battery. Therefore, a circuit capable of allowing the voltage drop in the fusible body is connected to the circuit terminal, while a part associated with a circuit that particularly requires suppression of the voltage drop in the fusible body is connected to the component terminal.

According to the third aspect of the present invention, the battery terminal integrated with the fuse can further be decreased in size by the shape of the fusible body described above.

According to the fourth aspect of the present invention, the component terminal is provided as the terminal located on the side of the battery in the component connector to which the fuse located between the detection circuit and the battery is connected. With such a component terminal, therefore, the residual capacity of the battery can be detected with high accuracy.

DETAILED DESCRIPTION

Figure 1:
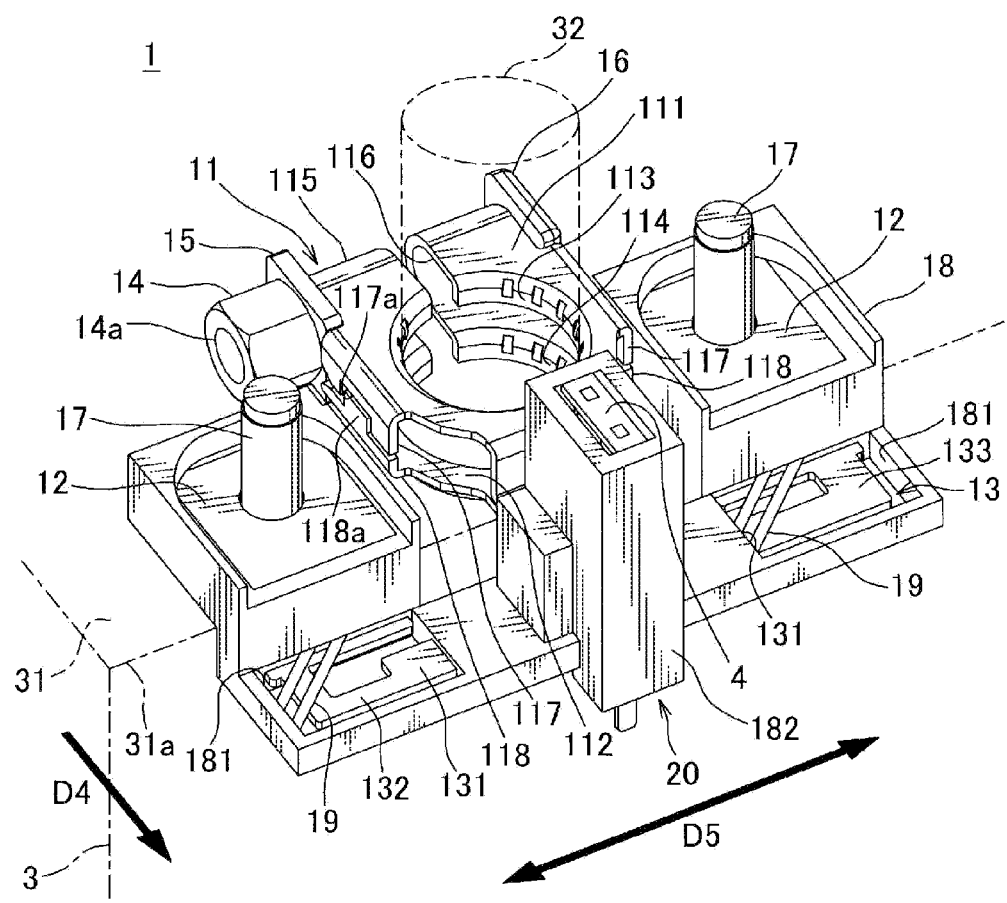
FIG. 1 is a perspective view of a battery terminal according to an embodiment of the present invention.
Figure 2:
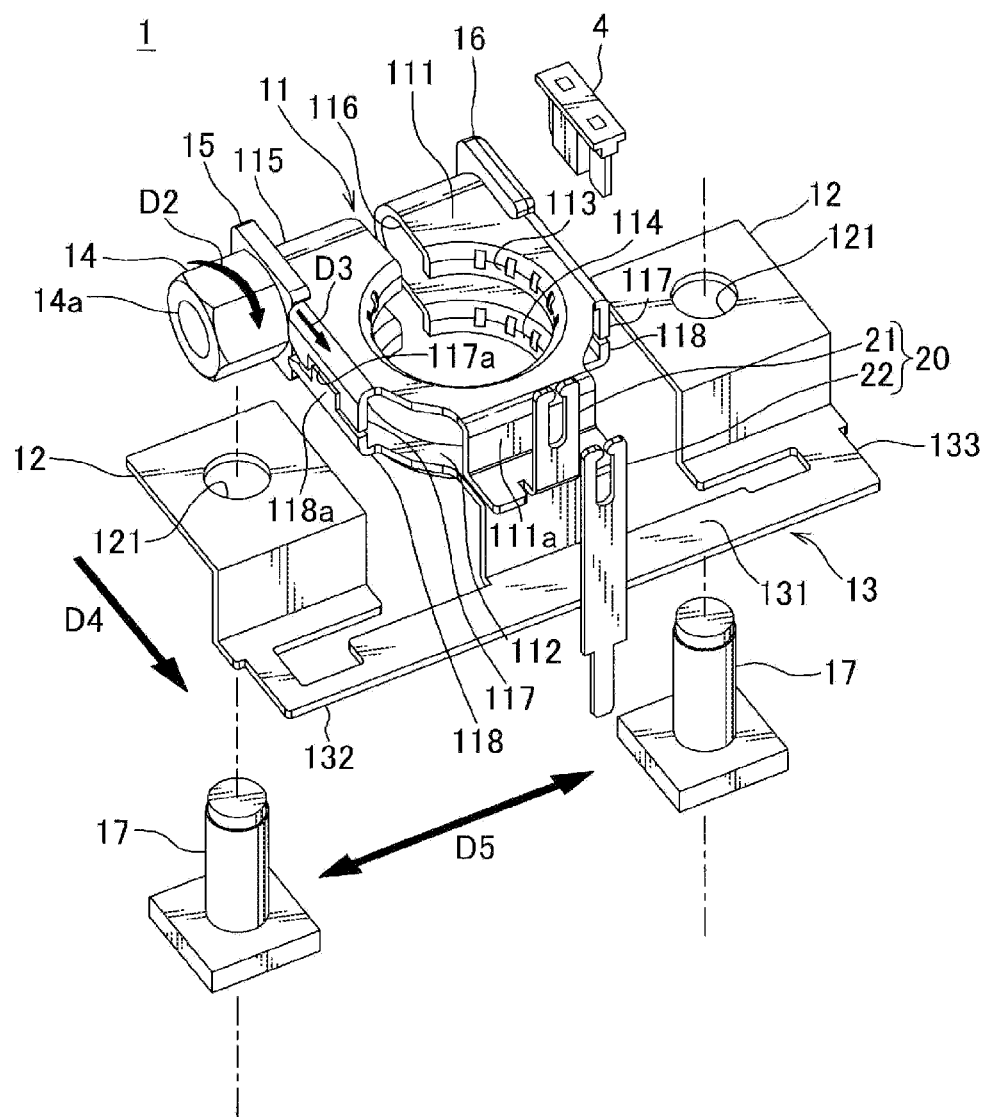
FIG. 2 illustrates the battery terminal of FIG. 1 with a resin housing removed therefrom.
Figure 3:
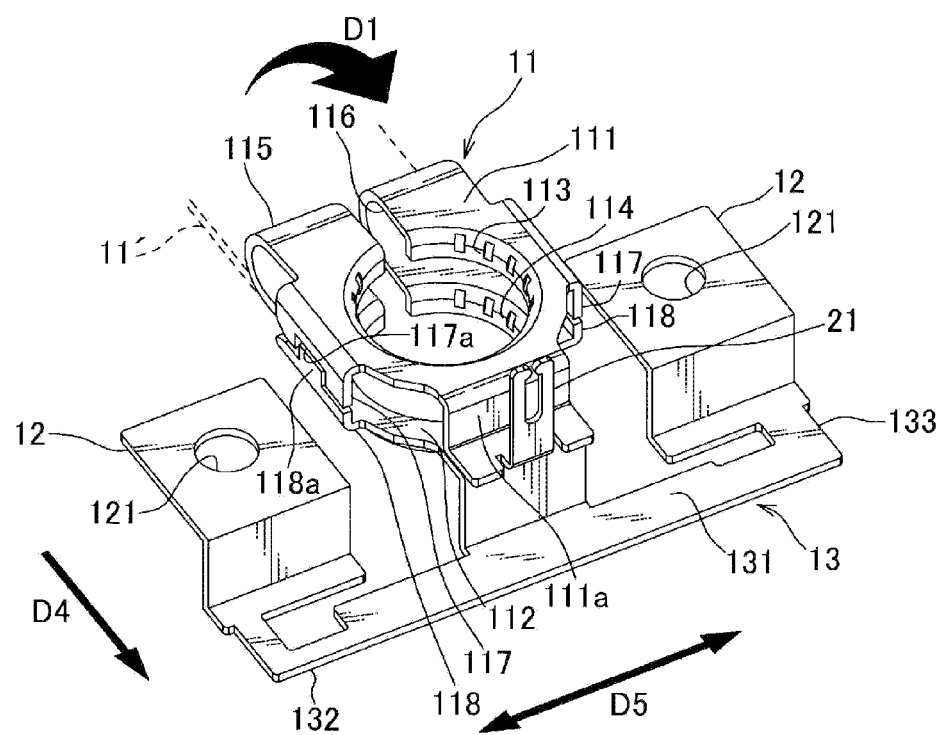
FIG. 3 is a perspective view of a structure of the battery terminal illustrated in FIG. 1, including a terminal body, a component terminal, a circuit terminal, and a fusible body.
Figure 4:
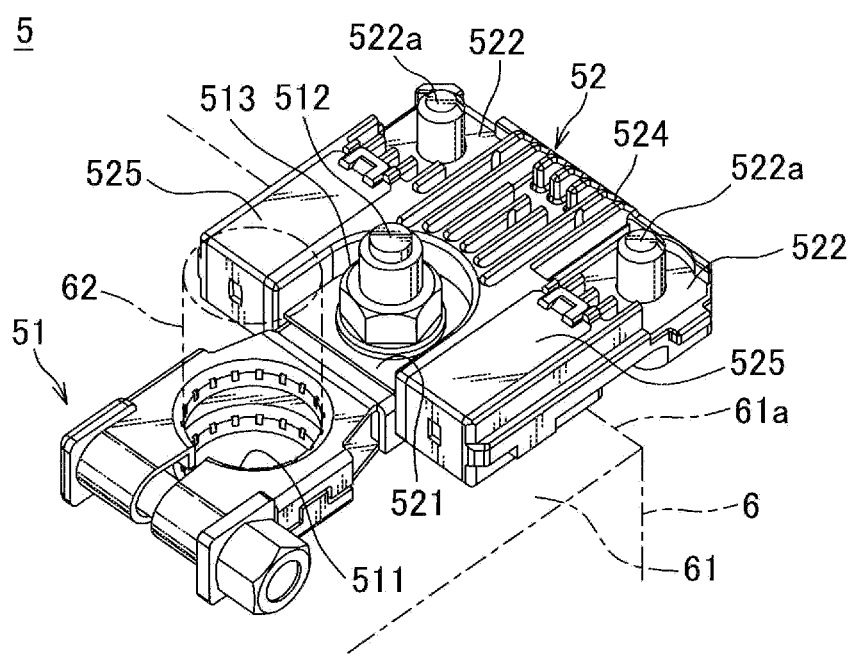
FIG. 4 illustrates a fuse unit including a related art example of a battery terminal.
Figure 5:
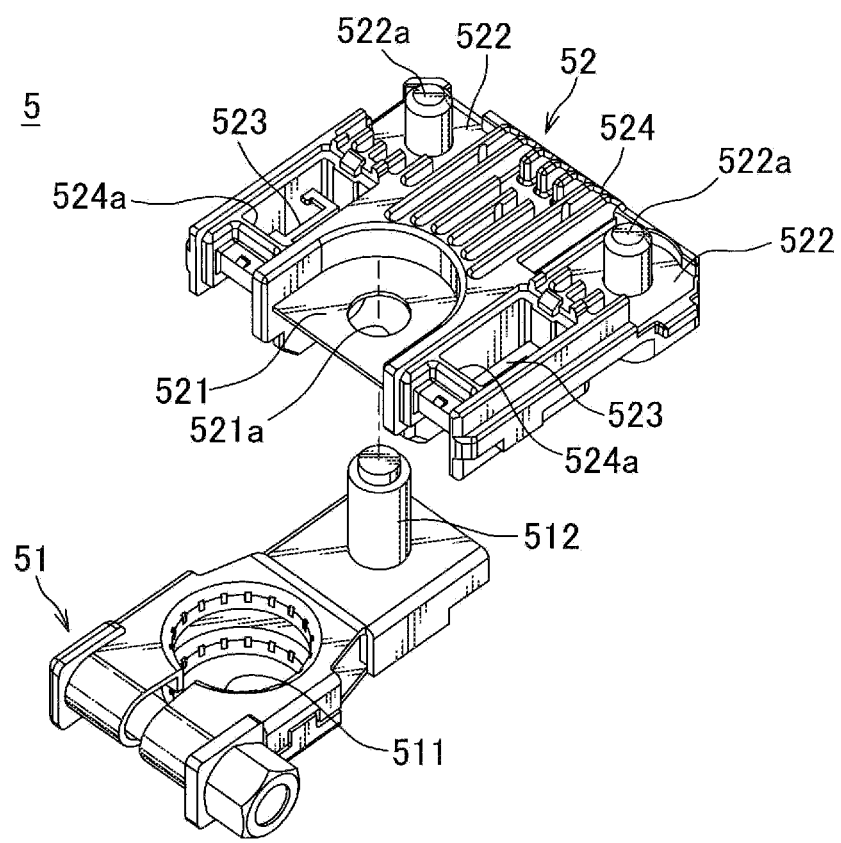
FIG. 5 is an exploded view of the fuse unit illustrated in FIG. 4.

A battery terminal according to an embodiment of the present invention will be described by referring to FIGS. 1 to 3. FIG. 1 is a perspective view of a battery terminal according to the embodiment of the present invention, and FIG. 2 illustrates the battery terminal of FIG. 1 with a resin housing removed therefrom. FIG. 3 is a perspective view of a structure of the battery terminal illustrated in FIG. 1, including a terminal body, a component terminal, a circuit terminal, and a fusible body.

A battery terminal 1 of the present embodiment is mounted directly on a rod-like electrode 32, which projects from a terminal mounting surface 31 of a battery 3. The battery terminal 1 includes a terminal body 11, a circuit terminal 12, and a fusible body 13.

The terminal body 11 has a shape extending toward an outer periphery 31a of the terminal mounting surface 31, when coupled to the rod-like electrode 32. As illustrated in FIG. 3, the terminal body 11 is provided with electrode insertion holes 113, 114 through which the rod-like electrode 32 is inserted through a pair of opposing plates 111, 112 in sequence. The pair of opposing plates 111, 112 are formed by bending a strip-shaped plate 11' made of a conductive metal into a nearly U-shape. Of the pair of opposing plates 111, 112 in the terminal body 11, one opposing plate 112, which is located on the lower side of the drawing, is not moved, and the other opposing plate 111 is turned back in a direction of an arrow D1 toward the one opposing plate 112, as illustrated in FIG. 3.

The terminal body 11 is provided with a notch 116. The notch 116 extends from the electrode insertion hole 114 of the one opposing plate 112 and passes through a U-shaped turn-back portion 115 to reach the electrode insertion hole 113 in the other opposing plate 111. Diameters of the electrode insertion holes 113, 114 are decreased in accordance with the decrease of the notch 116. A fastening screw 14 for decreasing the width of the notch 116 is provided inside the turn-back portion 115 of the terminal body 11. A square washer 15 is provided between a screw head 14a of the fastening screw 14 and the turn-back portion 115. A tip end of the fastening screw 14 is screwed into a nut 16 that is provided opposite to the square washer 15 across the turn-back portion 115. A distance between the square washer 15 and the nut 16 is decreased, as the fastening screw 14 is fastened and, as a result of this, the width of the notch 116 is decreased to thereby decrease the diameters of the electrode insertion holes 113, 114.

When the fastening screw 14 is fastened with the rod-like electrode 32 being inserted into the electrode insertion holes 113, 114 to decrease the diameters of the electrode insertion holes 113, 114, the rod-like electrode 32 is mechanically fixed and electrically connected to the terminal body 11. When the terminal body 11 is thus mounted, the one opposing plate 112 opposes the terminal mounting surface 31 of the battery 3.

In addition, on the side surface of the terminal body 11, a side wall 117 is bent up from the other opposing plate 111 toward the one opposing plate 112, while a side wall 118 is bent up from the one opposing plate 112 toward the other opposing plate 111. A recess 117a is provided on the side wall 117 of the other opposing plate 111, and a projection 118a, which is configured to fit into the recess 117a, is provided on the side wall 118 of the one opposing plate 112. As illustrated in FIG. 2, when the fastening screw 14 is fastened in a direction of an arrow D2, the square washer 15 tends to turn correspondingly in the same direction. At this time, the side wall 117 of the other opposing plate 111 acts as a rotation stopper of the square washer 15. As a result, the side wall 117 is pushed by the square washer 15 to move in a direction of an arrow D3, but the projection 118a, which is configured to fit into the recess 117a on the side wall 117, on the side wall 118 of the one opposing plate 112 acts to stop such movement. Thus, the deformation of the terminal body 11 can be restricted during the fastening of the fastening screw 14.

A circuit terminal 12 is a square plate made of a conductive metal and arranged approximately in parallel with the terminal mounting surface 31 of the battery 3. An insertion hole 121, through which a connection screw 17 is inserted, is formed in the center of the circuit terminal 12. The connection screw 17 is provided to connect a circuit, which is not illustrated and operates by power from the battery 3, to the circuit terminal 12. Two such circuit terminals 12 are provide in the present embodiment. These two circuit terminals 12 are arranged adjacent to the terminal body 11 as described below. Specifically, the terminal body 11 connected to the rod-like electrode 32 of the battery 3 is provided in such a manner that the circuit terminals 12 are arranged adjacent to the terminal body 11 in a direction crossing an extending direction D4 of the terminal body 11 extending toward the outer periphery 31a of the terminal mounting surface 31 and also in a crossing direction D5 approximately in parallel with the terminal mounting surface 31. In each of the circuit terminals 12, a round terminal, for example, which has been attached to the tip end of an electric wire extending from a circuit not illustrated, is passed through the connection screw 17 and fastened with the nut.

The fusible body 13 is provided to connect the terminal body 11 with the two circuit terminals 12 in a strip-shape manner, with a width of the strip being narrower than the terminal body 11 and the individual circuit terminals 12. The fusible body 13 extends from the terminal body 11 in the crossing direction D5 and, at a position apart from and ahead of the circuit terminal 12 in the extending direction D4, bends backward in the extending direction D4 to extend toward the circuit terminals 12. In the present embodiment, the fusible body 13 is arranged at a position lowered one stage from the circuit terminals 12 so as not to interfere with wires or the like of the circuit not illustrated and connected to the individual circuit terminals 12. As a result, an end portion of the individual circuit terminals 12 on the side of the fusible body 13 is bent downward by 90 degrees and connected to the fusible body 13. Similarly, the end portion of the lower opposing plate 112 located on the side of the fusible body 13 of the pair of opposing plates 111, 112, which constitute the terminal body 11, is also bent downward by 90 degrees and connected to the fusible body 13. In addition, the fusible body 13 includes a base portion 131 connected to the end portion of the lower opposing plate 112. On both ends of the base portion 131, fusing portions 132, 133 formed narrower than the base portion 131 and fused when an electric current having a current value exceeding a threshold value is flowed through the fusing portions 132, 133. Of the fusing portion 132, 133 connecting to the respective circuit terminals 12, the fusing portion 132 located on the right side of the drawing is formed narrower than the fusing portion 133 located on the left side of the drawing. Accordingly, the fusing portion 132 located on the left side of the drawing acts as a small capacity fuse that is fused by an electric current smaller than that needed to fuse the fusing portion 133 located on the right side of the drawing. The part of the fusible body 13 extending in the extending direction D4 is formed shorter than the part extending in the crossing direction D5.

In the battery terminal 1 of the present embodiment, the end portion of the terminal body 11 on the side of the fusible body 13, the two circuit terminals 12, and the fusible body 13 are formed by molding with an insulation resin material. A resin housing 18 made of an insulation resin material includes a window 181 from which a connection surface of the individual circuit terminals 12 is exposed and fusing of the fusible body 13 can be visually confirmed. In this state, the resin housing 18 covers and fixes part of the end portion of the terminal body 11 on the side of the fusible body 13, the two circuit terminals 12, and the fusible body 13. The resin housing 18 is formed by insert molding and integrally formed with the terminal body 11, the two circuit terminals 12, and the fusible body 13. The insert molding is performed while the connection screw 17 is inserted in the insertion hole 121 of the circuit terminal 12. The window 181 for visual confirmation of the fusing in the resin housing 18 is covered by a transparent cover 19 to allow visual confirmation of the fusing of the fusible body 13 through the transparent cover 19.

Further, a component connector 20 configured to connect an external fuse 4 located between the detection circuit not illustrated and the battery 3 to detect a residual capacity of the battery 3 is formed in the battery terminal 1 of the present embodiment. The external fuse 4 is a small capacity fuse that is fused by an electric current having a smaller threshold value than that of the fusing portions 132, 133 of the fusible body 13. As illustrated in FIG. 2, the component connector 20 includes a pair of component terminals 21, 22 stored in a connector housing 182 that is provided as part of the resin housing 18 of the battery terminal 1. The pair of component terminals 21, 22 are strip-shaped and arranged opposite to each other such that one of the component terminals 21, 22 is located on the side of the battery and the other component terminal is located on the side of the detection circuit. Of the pair of component terminals 21, 22, the component terminal 21 located on the side of the battery has one end formed to clip one end of the fuse 4 and the other end formed integrally with the terminal body 11. The component terminal 22 located on the side of the detection circuit is formed separately from the terminal body 11. One end of the component terminal 22 has a shape clipping the other end of the fuse 4 and the other end of the component terminal 22 is connected to the detection circuit.

As illustrated in FIGS. 2 and 3, the battery terminal 1 of the present embodiment includes the terminal body 11, the circuit terminals 12, the fusible body 13, and the component terminal 21 located on the side of the battery of the pair of component terminals 21, 22, by integrally cutting these elements from the single plate made of the conductive metal. The component connector 20 mentioned above is formed by insert molding by arranging the component terminal 22 located on the side of the detection circuit to oppose the component terminal 21 located on the side of the battery in a molding of the insert molding.

The component terminal 21 located on the side of the battery is provided on the upper opposing plate 111 of the pair of opposing plates 111, 112 that constitute the terminal body 11. A part of the opposing plate 111 has an opposite portion 111a located opposite to the turn-back portion 115, when viewed from the electrode insertion hole 113, which is bent in the shape of a step, as illustrated in FIGS. 2 and 3. Specifically, the opposite portion 111a first extends in parallel with the opposing plate 112 located in the lower side of the drawing. The opposite portion 111a is then bent downward by 90 degrees toward the lower opposing plate 112, and bent again by 90 degrees to extend in parallel with the lower opposing plate 112 until the opposite portion 111a touches and overlaps the lower opposing plate 112. At the opposite portion 111a, the component terminal 21 located on the side of the battery is bent up toward the upper side of the drawing from the edge of the part where the opposite portion 111a overlaps the lower opposing plate 112.

In the present embodiment, the pair of the component terminals 21, 22 is thinner than the plate that constitutes the terminal body 11, the circuit terminal 12, and the fusible body 13. The component terminal 21 of the pair of component terminals 21, 22 located on the battery side is provided integrally with the upper opposing plate 111 is cut out from the single plate made of the conductive metal continuously from the lower opposing plate 112, and subject to thickness-decreasing processing to decrease the thickness of the component terminal 21.

The fusible body 13 is coupled to the lower opposing plate 112 at a portion bent further downward by 90 degrees from the edge of the opposing plate 112 located on the lower side of the drawing and overlapping the upper opposing plate 111. Thus, the component terminal 21 located on the side of the battery is arranged closer to the terminal body 11 than the fusible body 13.

In the battery terminal 1 according to the present embodiment described above, the terminal body 11 and the above-mentioned component terminal 21 located on the side of the battery are cut integrally from the single plate made of the conductive metal. Therefore, the voltage drop between the terminal body 11 and the component terminal 21 is suppressed. Accordingly, the voltage drop between the external fuse 4 connected to the component terminal 21 and the battery 3 can be suppressed. Then the voltage drop between the battery 3 and the detection circuit not illustrated that detects a residual capacity of the battery 3 can be suppressed.

The battery terminal 1 of the present embodiment is provided with the fusing function in itself, and the size of the battery terminal 1 is decreased by forming the terminal body 11, the circuit terminal 12, and the fusible body 13 by cutting them integrally from the single plate made of the conductive metal. The component terminal 21 described above is arranged closer to the terminal body 11 than the fusible body 13, that is, in the upstream side of the fusible body 13 in the current flow from the battery 3. Therefore, it may be possible that a circuit capable of allowing the voltage drop in the fusible body 13 is connected to the circuit terminal 12, while a part, such as the external fuse 4 described above, which is associated with a circuit that particularly requires suppression of the voltage drop, is connected to the component connector 20.

In addition, the size of the battery terminal 1 of the present embodiment has further been decreased from the shape of the fusible body 13 mentioned above.

In the battery terminal 1 of the present embodiment, the external fuse 4 located between the battery 3 and the detection circuit that detects the residual capacity of the battery 3 is connected to the component connector 20 in which the terminal body 11 and the component terminal 21 on the side of the battery are formed integrally. Accordingly, the voltage drop between the detection circuit and the battery 3 can be suppressed and the residual capacity of the battery 3 can be detected with high accuracy.

The embodiment described above is only a representative example of the present invention, and the present invention is not limited to such embodiment. That is, various modifications are possible to implement the present invention without departing from the spirit of the invention. Such modifications, of course, fall within the scope of the present invention so long as the structure of the battery terminal according to the present invention is provided.

For example, in the embodiment described above, the battery terminal 1 with the fusing function has been described as an example of the battery terminal of the present invention, in which the two circuit terminals 12 are connected to the terminal body 11 via the fusible body 13. However, the battery terminal of the present invention is not limited thereto, and a battery terminal may not include the fusing function and only a component terminal may be provided to the terminal body.

Further, in the embodiment described above, the battery terminal 1 with the fusing function has been described as an example of the battery terminal of the present invention, in which the two circuit terminals 12 are connected to the terminal body 11 via the fusible body 13. However, the battery terminal with the fusing function is not limited to such an embodiment, and one circuit terminal or at least three circuit terminals may be provided. When more than one circuit terminal is provided, the fusible body may not be provided to all the circuit terminals, and may only be provided to the circuit terminals connected to the circuit that requires protection from fusing.

As an example of the fusible body that "extends both in the extending direction and the crossing direction, with the part extending in the extending direction being shorter than the part extending in the crossing direction" as recited in the present invention, the fusible body 13 having the L-shaped fusing portions 132, 133, which are bent down by 90 degrees on the way, has been described in the above embodiment. However, the fusible body recited in the present invention is not limited thereto, and may have a meandering shape so long as the part of the fusible body extending in the extending direction is shorter than the part extending in the crossing direction.

The battery terminal 1 in which the external fuse 4 located between the battery 3 and the detection circuit that detects the residual capacity of the battery 3 is connected to the component connector 20 having the component terminal 21, which is formed integrally with the terminal body 11, has been described as an example of the battery terminal of the present invention. However, the battery terminal of the present invention is not limited thereto, and the component terminal to which an electrical component other than the fuse, such as a small relay or the like, is provided integrally with the terminal body may be provided.

Further, the circuit terminals 12 having the square shape and arranged approximately in parallel with the terminal mounting surface 31 of the battery 3 have been described in the above embodiment as an example of the circuit terminal recited in the present invention. However, the circuit terminal of the present invention may be, for example, the circuit terminal arranged approximately in parallel with the side surface crossing perpendicularly to the terminal mounting surface in the battery, or may be bent in the L-shape. That is, any arrangement or shape of the circuit terminal may be used as the circuit terminal of the present invention so long as the circuit terminal is connected to the circuit that operates by power from the battery.

What is claimed is:

1. A battery terminal, comprising:
 a terminal body having a shape extending toward an outer periphery of a terminal mounting surface of a battery when the terminal body is directly connected to a rod-like electrode projecting from the terminal mounting surface;
 a circuit terminal connected to a circuit operating by power from the battery; and
 a component terminal to which a predetermined electrical component is connected,
 wherein the terminal body, the circuit terminal and the component terminal are formed by being cut integrally from a single plate made of a conductive metal.

2. The battery terminal according to claim 1, further comprising:

a fusible body connecting the battery terminal and the circuit terminal in a strip-shape manner, with a width of the strip being narrower than widths of the battery terminal and the circuit terminal, and configured to be fused when an electric current over a threshold value flows, wherein the terminal body, the component terminal, the circuit terminal, and the fusible body are formed by being cut integrally from a single plate made of the conductive metal, and wherein the component terminal is arranged closer to the terminal body than the fusible body.

3. The battery terminal according to claim 2, wherein the fusible body extends only in a crossing direction that crosses an extending direction of the battery terminal and approximately in parallel with the terminal mounting surface, or the fusible body extends both in the extending direction and the crossing direction such that a part of the fusible body extending in the extending direction is shorter than a part of the fusible body extending in the crossing direction.

4. The battery terminal according to claim 3, wherein a fuse is connected between a detection circuit detecting a residual capacity of the battery and the battery via a component connector, the component connector includes a pair of terminals formed in a strip-shape manner and arranged opposite to each other such that one of the pair of the terminals is located on a side of the battery and the other of the pair of the terminals is located on a side of the detection circuit, the one of the pair of the terminals located on the side of the battery has one end having a shape clipping one end of the fuse and the other end formed integrally with the terminal body, the other of the pair of the terminals located on the side of the detection circuit is formed separately from the terminal body and has one end having a shape clipping the other end of the fuse and the other end being connected to the detection circuit, and the component terminal is provided as the terminal of the component connector located on the side of the battery.

5. The battery terminal according to claim 2, wherein a fuse is connected between a detection circuit detecting a residual capacity of the battery and the battery via a component connector, the component connector includes a pair of terminals formed in a strip-shape manner and arranged opposite to each other such that one of the pair of the terminals is located on a side of the battery and the other of the pair of the terminals is located on a side of the detection circuit, the one of the pair of the terminals located on the side of the battery has one end having a shape clipping one end of the fuse and the other end formed integrally with the terminal body, the other of the pair of the terminals located on the side of the detection circuit is formed separately from the terminal body and has one end having a shape clipping the other end of the fuse and the other end being connected to the detection circuit, and the component terminal is provided as the terminal of the component connector located on the side of the battery.

6. The battery terminal according to claim 1, wherein a fuse is connected between a detection circuit detecting a residual capacity of the battery and the battery via a component connector, the component connector includes a pair of terminals formed in a strip-shape manner and arranged opposite to each other such that one of the pair of the terminals is located on a side of the battery and the other of the pair of the terminals is located on a side of the detection circuit, the one of the pair of the terminals located on the side of the battery has one end having a shape clipping one end of the fuse and the other end formed integrally with the terminal body, the other of the pair of the terminals located on the side of the detection circuit is formed separately from the terminal body and has one end having a shape clipping the other end of the fuse and the other end being connected to the detection circuit, and the component terminal is provided as the terminal of the component connector located on the side of the battery.

* * * * *